(12) United States Patent
Hogan

(10) Patent No.: US 7,603,332 B2
(45) Date of Patent: Oct. 13, 2009

(54) DEVICES, SYSTEMS, AND METHODS FOR MEDIATED RULE-BASED TRANSLATION SYSTEM CONFIGURATION INFORMATION

(75) Inventor: Michael Hogan, Schwenksville, PA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 993 days.

(21) Appl. No.: 10/626,443

(22) Filed: Jul. 24, 2003

(65) Prior Publication Data

US 2004/0187093 A1 Sep. 23, 2004

Related U.S. Application Data

(60) Provisional application No. 60/401,381, filed on Aug. 6, 2002.

(51) Int. Cl.
*G06F 17/00* (2006.01)
(52) U.S. Cl. .................................................. 706/47
(58) Field of Classification Search ............... 717/114; 706/60, 13, 47, 62; 700/51
See application file for complete search history.

(56) References Cited

U.S. PATENT DOCUMENTS

| | | | |
|---|---|---|---|
| 6,195,665 B1 * | 2/2001 | Jarett | 715/500 |
| 6,289,266 B1 * | 9/2001 | Payson et al. | 700/274 |
| 6,292,932 B1 | 9/2001 | Baisley | |
| 6,308,178 B1 | 10/2001 | Chang | |
| 6,476,828 B1 | 11/2002 | Burkett | |
| 6,578,030 B1 | 6/2003 | Wilmsen | |
| 6,834,370 B1 * | 12/2004 | Brandl et al. | 715/201 |
| 6,996,589 B1 * | 2/2006 | Jayaram et al. | 707/204 |
| 7,020,876 B1 * | 3/2006 | Deitz et al. | 718/100 |
| 2001/0018643 A1 * | 8/2001 | Brown | 703/6 |

(Continued)

FOREIGN PATENT DOCUMENTS

| EP | 1 122 652 A1 | 8/2001 |
|---|---|---|
| EP | 1 150 206 | 10/2001 |

OTHER PUBLICATIONS

'Knowbel: A hybrid tool for building expert systems': Mylopoulos, IEEE, Proc. Second IEEE Int'l Conf on tools for AI. 1993, pp. 17-24.*

(Continued)

*Primary Examiner*—David R Vincent
*Assistant Examiner*—Peter Coughlan
(74) *Attorney, Agent, or Firm*—Michael J. Wallace

(57) ABSTRACT

Certain exemplary embodiments can provide a computer-based translation method that translates source information into target information using knowledge that arises from relationships between elements of the source information. In certain embodiments, the computer-based method can comprise a plurality of activities comprising: obtaining information from one or more sources; applying a first plurality of pattern matching rules to the information to obtain a first transformed version of the information, the first plurality of pattern matching rules based on expert knowledge about a first plurality of patterns in the information; transforming the information using user input to obtain a second transformed version of the information, the user input obtained via a graphical user interface generated based on a second plurality of pattern matching rules, the second plurality of pattern matching rules based on expert knowledge about a second plurality of patterns in the information; and/or expressing the first transformed version and the second transformed version in a destination system.

45 Claims, 10 Drawing Sheets

U.S. PATENT DOCUMENTS

| | | | |
|---|---|---|---|
| 2001/0044794 A1 | 11/2001 | Nasr et al. | 707/4 |
| 2001/0047420 A1* | 11/2001 | Talanis et al. | 709/229 |
| 2001/0056429 A1* | 12/2001 | Moore et al. | 707/101 |
| 2002/0026633 A1* | 2/2002 | Koizumi et al. | 717/146 |
| 2002/0055804 A1* | 5/2002 | Betawar et al. | 700/117 |
| 2002/0077711 A1* | 6/2002 | Nixon et al. | 700/51 |

OTHER PUBLICATIONS

'Yahoo for Dummies': Hill, 2001, IDG books, $2^{nd}$ edition, pp. 115-124.*

PCT International Search Report, Mailed Oct. 22, 2004.

Professional XSL—"Programmer to Programmer", XP-002292878; Kurt Cagle et al.; Apr. 2001, pp. 9, line 1—p. 10, line 16.

* cited by examiner

3000

```
<?xml version="1.0"?>
<Order>
<Item
id='Turkey Sub'
size="large"
customer="Joseph Schmoe"
price="3.50"/>
<Item
id='Diet Coke'
size="medium"
customer="Joseph Schmoe"
price="0.90"/>
<Item
id="Fritos, 1.5 oz"
customer="Joseph Schmoe"
price="0.75" />
<Item
id='Hamburger'
size="medium"
customer="Betty Schmoe"
price="2.50"/>
<Item
id='Fries'
size="medium"
customer="Betty Schmoe"
price="0.99" />
<Item
id="Diet Coke"
size="medium"
customer="Betty Schmoe"
price="0.90" />
</Order>
```

```
<xsl:transform version="1.0"
   xmlns:xsl="http://www.w3.org/1999/XSL/Transform"
   xmlns:Prefs="Prefs">
   <xsl:output method="xml" encoding="UTF-8" indent="yes" />

<Prefs:Prefs customer="Joseph Schmoe">
      <Item id="Turkey Sub">
         <detail description="no mayo"/>
         <detail description="no onions"/>
         <detail description="extra lettuce" price="0.50" />
         <detail description="extra tomato" price="0.50" />
      </Item>
      <Item id="Grilled Chicken Sandwich">
         <detail description="no mayo"/>
      </Item>
      <Item id="Diet Coke">
         <detail description="no ice"/>
      </Item>
   </Prefs:Prefs>

<xsl:template match="/Order">
      <xsl:copy>
         <xsl:apply-templates select="Item"/>
      </xsl:copy>
   </xsl:template>

<xsl:template name="CustomizeItem" match="Item">
      <xsl:param name="CustomerName" select="./@customer" />
      <xsl:param name="ItemID" select="./@id" />
      <xsl:param name="CustomerPrefs"
         select="document('')/*/Prefs:*[@customer=$CustomerName]"/>
      <xsl:param name="CustItem"
         select="$CustomerPrefs/Item[@id=$ItemID]" />
         <Item id="{@id}"
            customer="{@customer}"
            special="{count($CustomerItem)>0}"
            base_price="{@price}"
            price="{./@price + sum($CustItem/detail/@price)}">
            <xsl:apply-templates
               select="$ CustItem/detail" mode="ApplyDetails"/>
         </Item>
   </xsl:template>

<xsl:template name="ApplyDetails" match="*" mode="ApplyDetails">
      <xsl:copy-of select="." />
   </xsl:template>
</xsl:transform>
```

```
<?xml version="1.0" encoding="UTF-8"?>
<Order>
   <Item id="Turkey Sub" customer="Joseph Schmoe" special="true"
      base_price="3.50" price="4.5">
      <detail description="no mayo" />
      <detail description="no onions" />
      <detail description="extra lettuce" price="0.50" />
      <detail description="extra tomato" price="0.50" />
   </Item>
   <Item id="Diet Coke" customer="Joseph Schmoe" special="true"
      base_price="0.90" price="0.9" >
      <detail description="no ice" />
   </Item>
   <Item id="Fritos, 1.5 oz" customer="Joseph Schmoe" special="false"
      base_price="0.75" price="0.75" />
   <Item id="Hamburger" customer="Betty Schmoe" special="false"
      base_price="2.50" price="2.5" />
   <Item id="Fries" customer="Betty Schmoe" special="false"
      base_price="0.99" price="0.99"/>
   <Item id="Diet Coke" customer="Betty Schmoe" special="true"
      base_price="0.90" price="0.9" >
      <detail description="extra ice" />
   </Item>
</Order>
```

```
<xsl:transform version="1.0"
xmlns:xsl="http://www.w3.org/1999/XSL/Transform"
xmlns:Preferences="Preferences">
<xsl:output method="xml" omit-xml-declaration="yes"
      encoding="UTF-8" indent="yes" />

<xsl:key name="KeyOrderByCustomer" match="Item"
      use="./@customer" />

<xsl:template match="/*">
<xsl:param name="CustomerFirstItem" select="//Item[count(.
| key('KeyOrderByCustomer', ./@customer )[1]) = 1]" />
<html>

<body >
<xsl:copy>
<xsl:apply-templates
select="$CustomerFirstItem"
mode="OrderByCustomer" />
</xsl:copy>
<form>Customer Comments<br/>
<input type="text"
name="'CustomerComments'" /><br/>
<input type="button"
name="'AcceptOrder'" value="Place Order"
onclick="SaveOrder.onclick();"/>

</form>
</body>
<xml id="SaveOrder"
onclick="
for(i=0;i!=document.forms.length;i++)
document.forms.item(i).innerHTML='_';
OrderXML=document.body.outerHTML;
OrderXML=OrderXML.replace('id=SaveOrder','id
="SaveOrder"');

OrderDoc=new XctiveXObject('Msxml2.DOMDocument.4.0');
OrderDoc.loadXML(OrderXML);
OrderDoc.save('C://Documents and Settings//hogamx//My
Documents//Patent//order.xml');
"/>
</html>
</xsl:template>
```

```
<xsl:template name="OrderByCustomer" match="Item"
mode="OrderByCustomer">
<xsl:param name="CustomerName" select="@customer" />
<div><h2>
<xsl:value-of select="@customer"/> Order
<table >
<xsl:apply-templates
select="//Item[@customer=$CustomerName]"
mode="ListAndCustomizeItem" />
</table>
</h2></div>
</xsl:template>

<xsl:template name="ListAndCustomizeItem" match="Item"
mode="ListAndCustomizeItem">
<xsl:param name="CustomerName" select="./@customer" />
<xsl:param name="ItemType" select="./@type" />
<xsl:param name="CustomerPreferences"
          select="document(concat($CustomerName,
' Prefs.xml'))/Preferences" />
<xsl:param name="CustomerItemPreferences"
select="$CustomerPreferences/Item[@type=$ItemType]" />
<xsl:param name="ItemID"
select="concat($CustomerName,'item',position())" />
<tr><td>
<h3>
<xsl:value-of select="./@type"/>
</h3>
<Item type="{@type}"
      name="{$ItemID}"
      customer="{@customer}"
      special="{count($CustomerItemPreferences)>0}"
      base_price="{@price}"
      price="{./@price +
sum($CustomerItemPreferences/detail/@price)}">
<xsl:apply-templates select="$CustomerItemPreferences/detail"
mode="ApplyDetails">
<xsl:with-param name="ItemID" select="$ItemID" />
</xsl:apply-templates>
</Item>
</td></tr>
</xsl:template>
```

```
<xsl:template name="ApplyDetails" match="detail"
mode="ApplyDetails">
<xsl:param name="ItemID" select="''" />
<xsl:param name="DetailID"
select="concat($ItemID,'detail',position())" />
<detail  description="{@description}"
id="{$DetailID}" />
<tr><td></td><td><h4>
<xsl:value-of select="@description" />
<xsl:apply-templates select="." mode="Make-GUI">
<xsl:with-param name="DetailID"
select="$DetailID" />
</xsl:apply-templates>
</h4></td></tr>
</xsl:template>

<xsl:template name="Extra-GUI"
match="detail[starts-with(@description,'extra ')]"
mode="Make-GUI">
        <xsl:param name="DetailID" select="''" />
<xsl:param name="extra-item" select="./@description" />
<form>
<input TYPE="radio" NAME="'HowMuchExtra'"
onclick="document.getElementById('{$DetailID}').howmuchextra='
a little'"> a little
<xsl:value-of select="$extra-item" />
   </input>
    <input TYPE="radio" NAME="'HowMuchExtra'"
onclick="document.getElementById('{$DetailID}').howmuchextra='
a little'"> some
<xsl:value-of select="$extra-item" />
</input>
<input TYPE="radio" NAME="'HowMuchExtra'"
onclick="document.getElementById('{$DetailID}').howmuchextra='
a little'"> whole lotta extra <xsl:value-of select="$extra-
item" />
</input>
</form>
</xsl:template>

</xsl:transform>
```

Joseph Schmoe Order
Turkey Sub no mayo

*no onions* extra lettuce

○ a little extra lettuce    ⊙ some extra lettuce    ○ whole lotta extra extra lettuce extra tomato ○ a little extra tomato    ○ some extra tomato    ⊙ whole lotta extra extra tomato Diet Coke no ice Fritos, 1.5 oz

Betty Schmoe Order
Hamburger

Fries no salt

Diet Coke extra ice

⊙ a little extra ice    ○ some extra ice    ○ whole lotta extra extra ice

Customer Comments
| I love this place |

[Place Order]

```
<Order xmlns:Preferences="Preferences">
<Item type="Turkey Sub" name="Joseph Schmoeitem1"
customer="Joseph Schmoe" special="true"
base_price="5.5" price="6.5">
<detail description="no mayo"
id="Joseph Schmoeitem1detail1" />
<detail description="no onions"
id="Joseph Schmoeitem1detail2" />
<detail description="extra lettuce"
id="Joseph Schmoeitem1detail3"
howmuchextra="some" />
<detail description="extra tomato"
id="Joseph Schmoeitem1detail4"
howmuchextra="whole lotta" />
</Item>
<Item type="Diet Coke" name="Joseph Schmoeitem2"
customer="Joseph Schmoe" special="true"
base_price="0.9" price="0.9">
<detail description="no ice"
id="Joseph Schmoeitem2detail1" />
</Item>
<Item type="Fritos, 1.5 oz" name="Joseph Schmoeitem3"
customer="Joseph Schmoe" special="false" base_price="0.75"
price="0.75" />
<Item type="Hamburger" name="Betty Schmoeitem1"
customer="Betty Schmoe" special="false"
base_price="2.5" price="2.5" />
<Item type="Fries" name="Betty Schmoeitem2"
customer="Betty Schmoe" special="true"
base_price="0.99" price="0.99">
<detail description="no salt"
id="Betty Schmoeitem2detail1" />
</Item>
<Item type="Diet Coke" name="Betty Schmoeitem3"
customer="Betty Schmoe" special="true"
base_price="0.9" price="0.9">
<detail description="extra ice"
id="Betty Schmoeitem3detail1"
howmuchextra="a little" />
</Item>
</Order>
```

Fig. 10

DEVICES, SYSTEMS, AND METHODS FOR MEDIATED RULE-BASED TRANSLATION SYSTEM CONFIGURATION INFORMATION

CROSS-REFERENCES TO RELATED APPLICATIONS

This application claims priority to, and incorporates by reference herein in its entirety, pending U.S. Provisional Patent Application Ser. No. 60/401,381, filed 6 Aug. 2002.

BACKGROUND

U.S. Pat. No. 6,292,932 (Baisley) allegedy cites "In a computing system having a repository program being executed by said system and a means for storing data, a method is disclosed for converting a UML model to a MOF model within the repository. This method includes the steps of selecting a package within the UML model, hereafter UML package, to be exported to the MOF model. Next, the UML package and its elements are exported to the MOF model. After this, relations are recursively set between MOF objects of the UML package that correspond to relations between UML objects in the package; and, MOF reference objects are created for navigable MOF association ends." See Abstract.

U.S. Pat. No. 6,308,178 (Chang) allegedy cites "A system for integrating data among heterogeneous source applications and destination applications including a knowledge repository containing temporary data storage for storing data from the source applications during processing for population in the destination applications, a library of data elements each providing a discrete data manipulation friction, configuration data storage for storing user-provided information describing the integration environment, and a plurality of add-on modules or cartridges which each include a plurality of predefined instruction sets defining chains of data elements to perform interface functions corresponding to a particular destination application. The underlying interface communication and processing functions are performed by an active component (or engine) according to the configuration data and the module instruction sets. The active component is driven by the repository data to load source data into the temporary data storage, translate, synchronize, and validate that data, then interface the data to a destination application. A configuration interface permits the user to configure the system." See Abstract.

U.S. Pat. No. 6,476,828 (Burkett) allegedy cites "Systems, methods and computer program products are provided for building and displaying dynamic graphical user interfaces (GUIs) that can be updated automatically without requiring code-level modification and recompiling. In response to a request to display a particular GUI on a computer display, an Extensible Markup Language (XML) data group is selected from a plurality of XML data groups and an XML display layout is selected from a plurality of XML display layouts. The selected XML data group includes one or more aggregations of data hierarchically ordered within the selected XML data group. XML data items are hierarchically ordered within each of the aggregations of data. The selected XML display layout contains one or more areas that define respective GUI display spaces within which XML data items from the respective aggregations of data can be displayed. XML markup tags associated with each aggregation of data within the selected XML data group are matched with XML markup tags associated with a respective area contained within the selected XML display layout. The XML data items contained within each aggregation of data are rendered in hierarchical order within a respective GUI display space defined by a respective area within the XML display layout." See Abstract.

U.S. Pat. No. 6,578,030 (Wilmsen) allegedy cites "a method for converting a searchable electronic catalog of the type used in e-commerce and industrial materiel systems. Such catalogs are typically configured as databases but can be created from a variety of different source materials. The method includes identifying a set of items to be converted, identifying the characteristics for each item, accessing the characteristic values for each identified item, accessing mapping rules for each characteristic and each item, mapping the characteristic values for each item in the first catalog into the characteristic identified by the rule for the item in the second catalog, and compiling the mapped characteristic values for each item to form the second catalog." See Abstract.

SUMMARY

Certain exemplary embodiments can provide a computer-based translation method that translates source information into target information using knowledge that arises from relationships between elements of the source information. In certain embodiments, the computer-based method can comprise a plurality of activities comprising: obtaining information from one or more sources; applying a first plurality of pattern matching rules to the information to obtain a first transformed version of the information, the first plurality of pattern matching rules based on expert knowledge about a first plurality of patterns in the information; transforming the information using user input to obtain a second transformed version of the information, the user input obtained via a graphical user interface generated based on a second plurality of pattern matching rules, the second plurality of pattern matching rules based on expert knowledge about a second plurality of patterns in the information; and/or expressing the first transformed version and the second transformed version in a destination system.

BRIEF DESCRIPTION OF THE DRAWINGS

The invention and its wide variety of potential embodiments will be more readily understood through the following detailed description, with reference to the accompanying drawings in which:

FIG. 3 is a listing of an exemplary embodiment of XML encoding an initial order;

FIG. 4 is a listing of an exemplary embodiment of XSLT encoding a transformation of the order of FIG. 3;

FIG. 5 is a listing of an exemplary embodiment of XML encoding a translated order generated by applying the transformation of FIG. 4 to the order of FIG. 3;

FIG. 6 is a listing of an exemplary embodiment of XSLT encoding a graphical user interface for obtaining user input for a transformation;

FIG. 7 is a continuation of the listing of the exemplary embodiment of FIG. 6;

FIG. 8 is a continuation of the listing of the exemplary embodiment of FIG. 7;

FIG. 9 is a graphical user interface of an exemplary embodiment; and

FIG. 10 is a listing of an exemplary embodiment of a final order.

DETAILED DESCRIPTION

Figure 1:
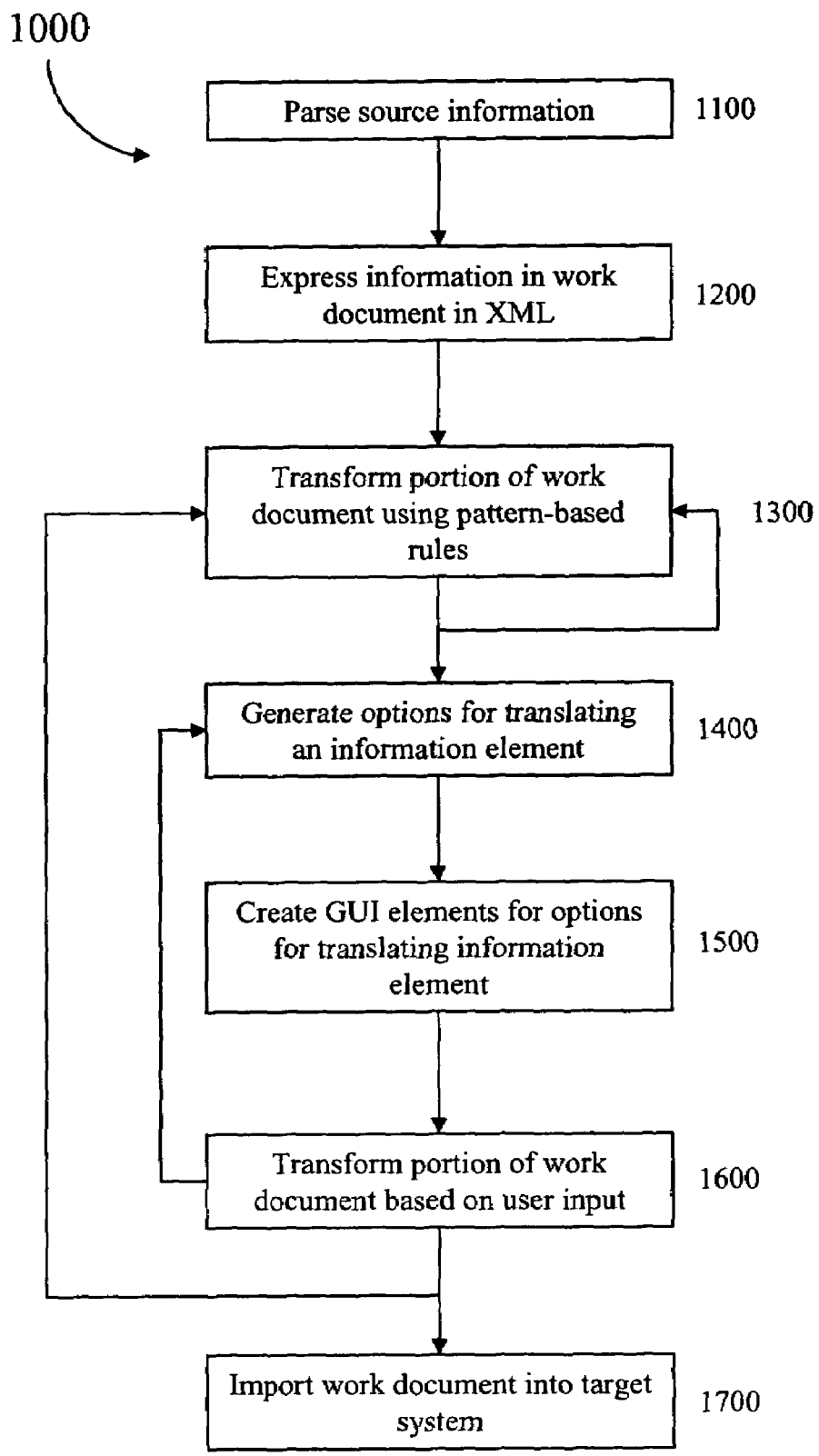
FIG. 1 is a flowchart of an exemplary embodiment of a method 1000.

Certain exemplary embodiments can translate configuration information from one computer-based system (e.g., a Siemens APACS control system) to another (e.g., a Siemens PCS 7 control system). Certain exemplary embodiments can use a design philosophy that is based on the fact that the configuration of many computer-based systems is a "knowledge based artifact". In essence, the creation of a configuration can involve an effort on the part of an expert in some field (e.g., Validated Bio-Pharmaceutical Batch Process Control) to create a solution to a problem (e.g., properly controlling a biopharmaceutical batch process) using available elements in some configurable system (e.g., an APACS control system). As a result, the computer system can be viewed as an expression of the expert's knowledge.

Furthering this example, since a control system configuration can embody considerable domain knowledge, it is possible to apply some formal knowledge systems engineering principles to the design of a translation tool. The following taxonomy and/or definitions can be used to classify all elements and activities involved in translating a database:

Data is binary information that may represent numbers, characters etc., but which has no "knowledge level" meaning. Rules for composing data are "syntax" rules. Data handling can be automated.

Information is data that has been organized to express concepts. Rules for composing Information are "semantic" rules. It is generally possible to automate certain tasks involving the management, organization, transformation, and/or presentation of information.

Knowledge is the ability to interpret information in order to extract greater meaning. Although there are isolated examples of computers performing "knowledge" tasks, such programs are not part of the everyday software engineering landscape. In certain exemplary embodiments, generally only humans handle knowledge tasks.

Competence is the ability to apply knowledge in order to accomplish some goal (e.g., configuring a control system). In certain exemplary embodiments, only humans are capable of competent action.

In certain exemplary embodiments, this design philosophy can result in the creation of a translation design pattern that supports the concept of a partnership between the translation engine and a human collaborator. In certain exemplary embodiments can support a seamless division of labor between the computer and the person who is initiating the translation. This division of labor can be made along natural boundaries—the computer can handle data and information aspects of the translation problem and the human can handle tasks requiring knowledge and competence.

The experts who program a configurable system generally use consistent programming patterns to express specific domain concepts. These patterns can manifest as relationships between the programming elements that make up the configuration. Such patterns can assume a variety of forms, e.g., certain elements appearing together as a set, certain hierarchical relationships between programming elements, certain naming conventions, etc. Certain exemplary embodiments are capable of identifying these patterns, relating them to corresponding domain concepts, and/or generating configuration information in the target system and/or document that encodes these concepts in such a way that the domain expert can easily recognize them. This technique, which can include translating at the knowledge level, can preserve the domain knowledge that is embodied in the source configuration.

Knowledge level translation can allow for rich interaction between the user and machine at the knowledge/information boundary. This interaction generally assumes the form of directed action (e.g., the tool can present the user with a few options for translating an element, and the user can direct the translation engine by selecting a particular option). In essence, knowledge level translators can function as a power-tool that is capable of amplifying a user's efforts. It accomplishes this by acting as an intermediary between the user and the actual source and target databases, documents, or systems.

Certain exemplary embodiments can lends themselves to the use of Rapid Application Development (RAD) tools and other inexpensive information technologies. Certain exemplary embodiments can be highly componentized and data-driven, and/or can be adapted to the requirements of a particular class of users (e.g., Validated Batch) or to an individual user at relatively low cost. In certain exemplary embodiments, much of the translation engine can be layered on open, standard information technologies (e.g., XML/XSLT). Thus, any participants in the translation process may add their own modifications to the tool.

FIG. 1 is a flowchart of an exemplary embodiment of a method 1000. Note that, unless specified otherwise, no particular activity of flowchart 1000 is required, and no particular sequence of activities is required. Thus, any activity shown on flowchart 1000 can be omitted and/or the sequence of activities can vary.

At activity 1100, information from a source can be received, obtained, and/or parsed. The information can be obtained and/or received from multiple sources, including a source system and/or document.

At activity 1200, the information can be converted to and/or expressed in a common and/or user-defined syntax and/or format, such as Extensible Mark-up Language ("XML") and/or Extensible Stylesheet Language Formatting Objects ("XSL-OF"). If the information is already in the desired syntax or format, additional processing need not be performed under this activity.

At activity 1300, at least a portion of the information can be transformed into a destination document, a work document, a central document, and/or a transformed version using pattern-based rules. Multiple occurrences of such transformations are possible. The transformations can be performed using a transformation-oriented computer language. If the source documents are provided in XML, a transformation-oriented computer language and/or process such as Extensible Stylesheet Language Transformations ("XSLT") and/or XML Path Language ("XPath") can be used to transform the source documents. The results of the transformations can be expressed in any number of computer languages. For example, the results can be expressed in a computer language useful for additional transformations, such as XML. As another example, the results can be expressed in a computer language useful for displaying information, such as XSL-OF, HTML, and/or DHTML.

One having expert knowledge of a domain that encompasses the information can create the pattern-based rules. The expert can be a provider and/or user of the information.

To generate certain rules, the domain expert can identify patterns that occur between two or more related elements of the information, such as knowledge elements, each of such elements identifiable as an entity in the information. In certain embodiments, the expert can identify that when certain patterns occur, an automated transformation of the information can occur. Exemplary patterns for which automated transformation might be applicable include when information elements belong to a common set, a hierarchy exists among certain elements, and/or a naming convention suggests a relationship between elements.

In certain embodiments, the expert can identify that when certain patterns occur, such as extremely complex patterns and/or patterns requiring subjective input, additional information should be obtained from a provider and/or user of the information.

At activity 1400, to obtain such subjective information, various potential options for translating and/or transforming an information element can be identified and generated. For example, if a customer of a fast food restaurant requests extra lettuce on a sandwich, options can be generated to determine the approximate quantity of lettuce desired, e.g., "a little extra", "medium extra", and/or "a lot extra".

At activity 1500, a graphical user interface can be created and presented to the user, the graphical user interface ("GUI") including the potential options for transforming the information element. For example, applying DHTML logic, DHTML can be generated that encodes the plurality of options, and the generated DHTML presented via a browser as a GUI to one or more users.

In certain embodiments, the options presented can vary by user. Thus, the GUI can render (i.e., make perceptible) a first plurality of options for a first user, and a second, different plurality of options for a second user, the first plurality of options related to a first information element or collection of elements, and the second plurality of options related to either the first information element or collection of elements and/or to a second information element or collection of elements. The first user can occupy a different position in a value chain and/or business process, such as a vendor-customer relationship and/or an order fulfillment process, than the second user.

At activity 1600, based upon the received user input, any portion of the information can be transformed. Multiple occurrences of such transformations are possible. Thus, the portion upon which a transform operates can have been previously transformed. Moreover, further user input regarding an information element and/or collection of elements can be solicited from and/or received from one or more users, and operated upon. For example, a first user's preferences and a second user's preferences for translating an information element can be received. In certain exemplary embodiments, one user's preferences can override, negate, and/or alter another user's preferences. In certain exemplary embodiments, user input can be tracked, thereby providing an audit trial of user input.

At activity 1700, the results of the transformations, the work document, the central document, and/or the destination document can be expressed in a target system, such as by importing the destination document into the target system. One or more users can view the results, and the views presented to different users can differ, perhaps depending on the needs of the user and/or the potential uses of the viewed transformed information. In certain exemplary embodiments, the source information and the transformed information can be viewed simultaneously. In certain exemplary embodiments, the source information, plurality of options for transforming the source information, and the transformed information can be viewed simultaneously, enabling a user to easily see the results of choosing a particular different transformation option. Moreover, the user can choose each different transformation option and see the results of that choice reflected in the transformed information.

Figure 2:
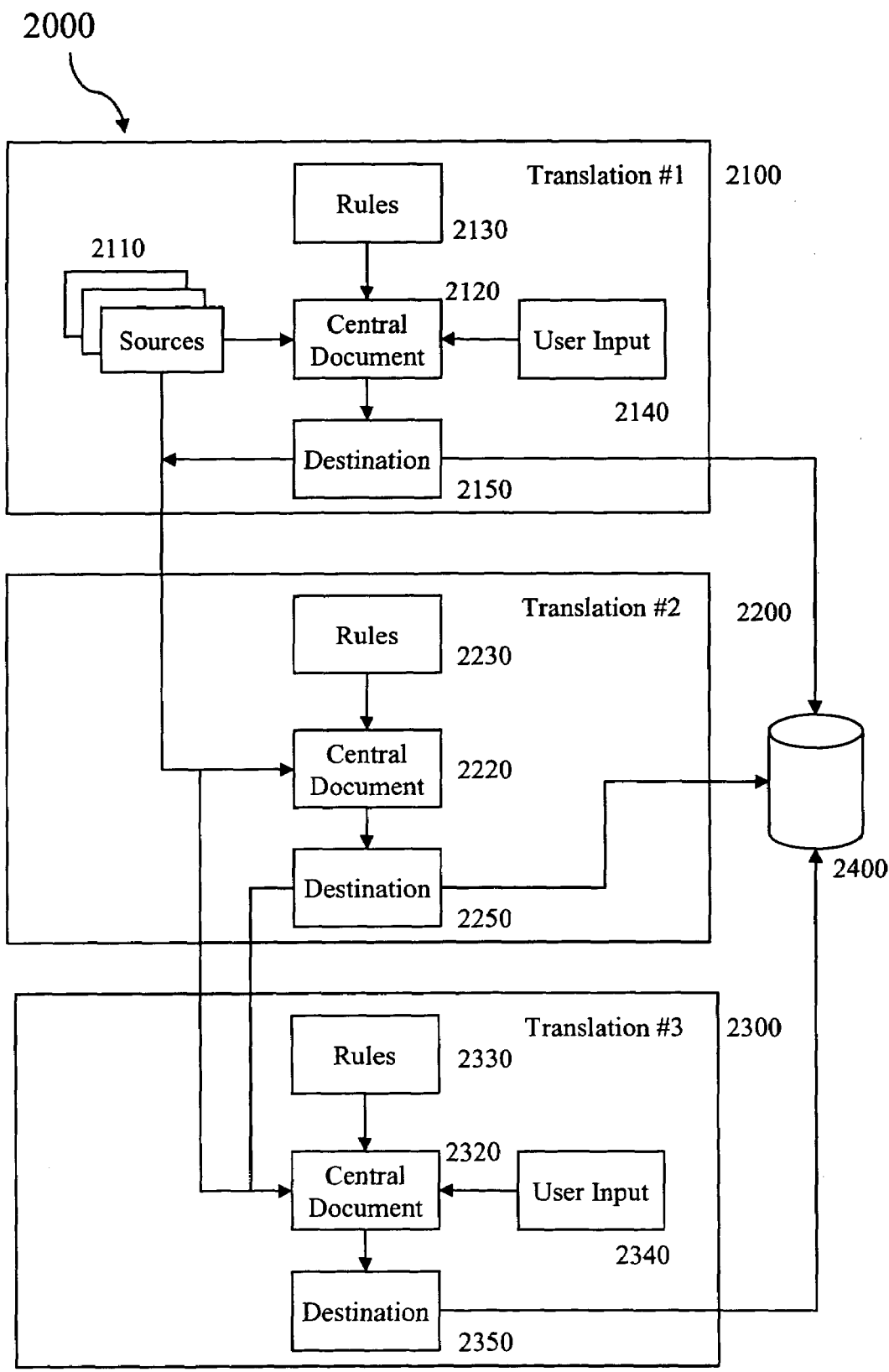
FIG. 2 is a block diagram of an exemplary embodiment of a system 2000.

FIG. 2 is a block diagram of an exemplary embodiment of a system 2000. First translation sub-system 2100 can perform a first translation using information received from one or more sources 2110 and provided to a central document 2120. Pattern-based rules 2130 and/or a first user input 2140 can be applied to the information to generate a first destination document 2150, any portion of the contents of which can be supplied to an ultimate destination 2400.

Second translation sub-system 2200 can perform a second translation using information received from one or more sources 2110 and/or first destination document 2150 and provided to a central document 2220. Pattern-based rules 2230 can be applied to the information to generate a second destination document 2250, any portion of the contents of which can be supplied to an ultimate destination 2400.

Third translation sub-system 2300 can perform a third translation using information received from one or more sources 2110, first destination document 2150, and/or second destination document 2250, and provided to a central document 2320. Pattern-based rules 2330 and/or a user input 2340 can be applied to the information to generate a third destination document 2350, any portion of the contents of which can be supplied to an ultimate destination 2400. Additional translation sub-systems and translations are possible.

EXAMPLE 1

Fast Food Franchise

What follows is a simple exemplary embodiment that illustrates how the translation technology can be used as a building block in a fast foot restaurant's business model. Many of the supporting figures show XML content and HTML pages that were used to create pieces of an actual working system that was created in support of this example. These XML figures are provided chiefly to allow the design to be independently verified and re-produced if needed.

Let us imagine a fast-food franchise. Its slogan is "We know you better than you know yourself" and its business model is based on remembering each individual customer's preferences for various types of food. The franchise only fills drive-through orders, and its drive-through facilities are equipped with facial recognition software that can identify customers as they drive up.

In this exemplary scenario, two regular customers, Joseph and Betty Schmoe enter the drive-through. The order entry system allows Joe and Betty to enter their individual orders. Joe orders a large Turkey Sub, a medium Diet Coke and a small bag of Fritos. Betty orders a medium Hamburger, a medium Diet Coke and medium Fries. The initial order is encoded as XML that appears in listing 3000 of FIG. 3.

The order entry system has source information in the form of an initial order and it has stored rules that tell how to customize Joe and Betty's individual orders according to preferences that they have expressed on previous visits. For example the system "knows" that Joe prefers Turkey Subs with extra lettuce, extra tomato, no mayo and no onions, and the system applies the relevant rules to Joe's order. These rules generate instructions for the preparation of Joe's food and also adjust the price of the order if needed (e.g., extra lettuce and tomato results in an increased price).

FIG. 4 provides an XSLT listing 4000 encodes a transformation of the order of FIG. 3 and shows how the rules for Joe's preferences might look. Note that Joe's preferences for various foods are stored in a table that starts "<Preferences: Preferences customer="Joseph Schmoe">". It is relatively easy to relate entries in this table to the description of Joe's food preferences. The transformation basically matches items in this table against items that Joe has ordered and uses the "<detail>" entries in this match to customize Joe's order.

By applying customization rules for Betty and Joe's orders, a custom order is generated. An XML encoding of such a customized order appears as listing 5000 in FIG. 5, which encodes the transformed information generated by FIG. 4. Note that the order contains enough information for billing, custom preparation of the items and even "packaging" (e.g., a "Joe" package with Joe's food could be prepared and a "Betty" package with Betty's food could be prepared).

This scenario illustrates a simple application of an exemplary embodiment. It illustrations the generation of source data that expresses some sort of knowledge. In this case, the "knowledge" consists of Joe and Betty's individual knowledge of what they want to eat. This scenario applies relevant "domain rules" to the source data. In this case, the domain rules consist of knowledge about Joe's fast-food preferences and Betty's fast-food preferences. This scenario generates a resulting document that has useful knowledge with a number of facts that were not relevant to the source systems (Joe and Betty's appetites) but they are very relevant to the destination system (the restaurant's order fulfillment system). Specifically, this scenario describes an XML document that can be used to: (1) tell the food preparation people how to assemble the individual items (e.g., what to add to an item, what to leave out), (2) tell the cashier what to charge and how to prepare a bill that itemizes the add-ons, (3) tell the servers how to package the meal (e.g., the resulting document tells that Joe gets the Diet Coke w/o ice while Betty gets the Diet Coke w/ extra ice).

Exemplary embodiments of the described system easily accommodate almost arbitrarily complex contextual rules. For example, assume that Joe actually likes onions, but Betty hates to be near him when he eats them. In that case, it is straightforward to make the translation logic work such that Joe's Turkey Sub is prepared without onions whenever Betty appears as a customer on the same order.

In certain exemplary embodiments, the previously described translation method can be used to generate a partial translation and a user interface that allows a user to interact with the partial translation in order to generate a final, complete translation.

By stating that a translation is "partial", it is meant that it can be impossible to make rules that will produce a satisfactory, complete translation. Incomplete translations arise most often when translation heuristics are too complex to express as simple rules, or when the source information is inherently subjective. For example, the concept of "extra lettuce" is inherently subjective—everyone has a slightly different interpretation of how much lettuce is meant by "extra".

To delve deeper, assume that there is a benefit to letting the customer specify how much "extra" they want. Recounting the previous activities, recall that that Joe and Betty place the order shown as 3000 in FIG. 3. The transform shown as 4000 in FIG. 4 was applied to obtain the customized order shown as 5000 in FIG. 5, which can be rendered via a graphical user interface and/or browser to the customer, a cashier, a food order assembler, etc. Yet at this point, the translation can be considered to be incomplete, because it is not known by the franchise how much extra lettuce and tomato Joe wants on his sub and it is not known by the franchise how much extra ice Betty wants in her Diet Coke.

This situation can be remedied by building a contextual graphical user interface in parallel with the "incomplete" translation that will allow the customers to assist in the translation. In this particular case, the customers can help interpret the meaning of "extra" in its three contexts. Assume that it is sufficient to present a user with 3 options for any "extra" item, namely: "a little extra", "some extra" and "a whole lot of extra". The XSL transformation shown in listing 6000, 7000, and 8000 of FIGS. 6, 7, and 8, respectively can be used to "partially translate" the input document FIG. 3 and simultaneously generate a GUI that allows the "translators" (in this case Joseph and Betty) to interactively refine the translation. The GUI appears as 9000 in FIG. 9. The final order is shown as 10000 in FIG. 10, which, for the sake of clarity, has been subjected to an additional transformation (not shown) in order to remove the HTML tags that comprised the "parallel GUI".

It can be seen that this example shows how a concept like "how much extra" can be handled using generic logic (refer to the "<form>" element at the end of FIG. 8). The example also shows how the "work document" (i.e. the XHTML that was used to render the page shown in FIG. 7) provides inherent support for persistence (we just save the document and re-load it when needed) and inherent support for annotation (e.g., the customer comment field at the bottom of FIG. 9).

In certain exemplary embodiments, it is possible to "cascade" rules in order to apply increasingly "domain specific" translation rules. Presumably, the domain-specific rules are rules that are relevant for various stake-holders in a value-chain and the rules generally reflect knowledge that pertains to their "link" in this chain.

The cascading of rules ordinarily assumes one of two basic forms:
The rules can be applied successively within a given translation effort; or
a translation "output" from one translation effort can serve as an "input" to "downstream" translation effort.

When translations are chained together, it is worth noting that the interconnection topography can get arbitrarily complex. For the purposes of this application, the "value chain" scenario will be based on the second form (output from one translation serves as the input of another) since it is a generalization of the "successive rules within one translation" structure.

The order of listing 10000 in FIG. 10 contains some information that relates to concepts that are part of the franchise business model. These pieces of information include the concept of a "special" order, the concept of a "detail" for an item on an order and the concept of a "base price" and a "final price" (labeled simply "price" in FIG. 10). Note that this information might not be of substantial concern to the customers per-se, but it can be of great interest to the restaurant. Note also that the information was not entered by the customer (system input), but was instead generated by the rules that govern the translation process.

A point worth developing is the notion that information in the order can be used by many entities in the restaurant, and that each of these entities are likely to use the information in a different way. For example, price information can be of interest to the cashier, the restaurant's accountants, and the restaurant management, but each of these parties can make different use of the price information. The items ordered and the detailed instructions for their preparation can be of interest to the food preparation people. The information that tells who-gets-what can be of interest to people who assemble the order and present it to the customer. The customer comment information can be of interest to the manager. These various interests represent a value chain that not only fulfills the order for Joe and Betty, but also extends to the management of the restaurant as a whole and management of the company that owns the restaurant.

By applying successive translations, input documents can be translated at each step of the value chain in order to knowledgeably transform the information in way that supports that link of the chain. For example, food preparation rules may stipulate that a sandwich containing lettuce and tomato must be assembled in 'meat, tomato, lettuce" order in order to make the sandwich presentable. A rule like this is an expert rule, and it can apply to Joe's Turkey Sub. Expert rules may also be applied to multiple orders to build aggregate information. For example, expert rules could determine how many "upgrades" (i.e., orders where the customization yields an increase in order price) a store is receiving and recommend strategies for improving this average. There may be expert rules that recommend that add-ons in combination (e.g., extra lettuce and extra tomato) can go a little heavy on the inexpensive lettuce and spare the costly tomato. This "lettuce /tomato" example is particularly interesting since it involves an interaction between the customer, the food preparation people, and the economic management of the restaurant. Note that by composing the basic building blocks of the translation pattern and using the output of one translation as the input for another can construct all of these scenarios.

EXAMPLE 2

Bailey INFI-90 Console Replacement

A particular exemplary embodiment was used to identify information entities appearing in a Bailey INFI-90 configuration database and generate corresponding configuration elements in a WinCC operator console. The objective of this particular translator was to automate work involved in replacing an existing Bailey console with a WinCC console.

The Bailey-to-WinCC translator had several distinct subsystems:

Bailey Export to XML—The translator used software furnished by Previse Inc. (124 Merton Street, Courtyard Suite 102, Toronto, Ontario M4S 2Z2) to parse configuration information from a Bailey configuration database. This information was then expressed in XML.

Applying Conversion Rules—XSLT sheets were created to transform the exported Bailey XML into a format that was suitable for importation into a WinCC configuration database. The WinCC configuration information actually had three distinct aspects—one pertaining to the declaration of structures in the WinCC configuration, one pertaining to the declaration of tags to be read from the Bailey system and one pertaining to messages that were used for alarm information. There was some advantage to translating these pieces separately, so a stylesheet was created for each of these three translations.

Importing into WinCC—Once the WinCC information was available as XML, it was straightforward to import the information into WinCC. The applicant has created software (WinCCODKUtilities) to permit the importation of XML into WinCC in order to support the design pattern that is the subject of this patent.

EXAMPLE 3

APACS to PCS7 Configuration Translator

A particular exemplary embodiment was used to identify entities appearing in an APACS control system configuration database and generate corresponding configuration elements in a PCS7 control system configuration database. The objective of the translator was to partially automate the task of replacing an APACS control system with a PCS7 control system. Fully automatic translation was not feasible, so the translator required a "knowledge level" graphical user interface in order to permit human interaction with the translation process.

The APACS to PCS7 translation system had several distinct parts:

The export of APACS information as XML—Software was created to parse an APACS configuration and express it in an XML syntax that was designed to simplify the translation to a PCS7 target.

Simultaneous "partial translation" and creation of GUI—Translation rules were applied to the source document in order to transform it to PCS7-compatible expressions of equivalent logic. At the same tine, the transformation would generate accompanying GUI information that would allow a user to interact and direct translation of the APACS logic to the PCS7 target wherever such interaction was appropriate.

User interaction—The translation document, bearing translation and GUI information, was interpreted by DHTML logic written in JavaScript contained in an HTML application (HTA). The JavaScript logic generated all required GUI elements (tree views, buttons, check-boxes etc.) that were required to support user interaction with the document.

Importation of configuration information into PCS7 system—Software, in the form of a COM object called "OPEN-ES Automation" was created to assist in the task of programmatically sending configuration information to a PCS7 target. Additional software was created that could interpret configuration information in the translation document and use the OPEN-ES software (and other additional programmatic interfaces to the SIMATIC system) in order to express the translated configuration information in the PCS7 target.

For certain exemplary embodiments, pattern recognition languages (e.g., XPath/XSLT) can be well-suited for recognizing relationships between entities in a source document for the purposes of identifying "knowledge" elements in the source configuration and transforming the information in accordance with rules based on those patterns. In general, such transformations may be "composited", so that successive translations may recognize increasingly specific structures in the source document. The transformations that appear at the end of the transformation sequence can elaborate on earlier transformations or they can even contradict them.

This capability of compositing transformations raises the possibility of having the translation rules match the value chain involved in a translation effort. It is assumed that translation products will generally have a "core" translation capability. This core translator will often be applied to diverse domains (e.g., batch control logic, continuous control logic, etc.). Within a domain, the translator can be adapted to conform to customer standards. Finally, the translator can be adapted on a project-by-project basis (e.g., to conform with laws regarding industrial processes in one locale vs. another).

Thus, translation rules can be matched to a value chain that exists between a vendor and a customer with regards to a particular translation effort. Such a value chain approach can be supported and enhanced by the underlying technology used in certain translators (in this case, HTML applications, XML, and/or XPath/XSLT) because the subject technologies can be inherently Internet/intranet enabled and therefore can be delivered to remote customers quickly, easily, and inexpensively using standard Internet/intranet transport mechanisms.

If translators are interconnected in an acyclic topography, then it is always possible to optimize any particular sequence of successive transformations by creating a single transformation that is equivalent to the original sequence.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, section, abstract, drawing figure, etc.) of this application, unless clearly specified to the contrary, there is no requirement for any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive.

What is claimed is:

1. A computer-based translation method that translates source information into target information using knowledge that arises from relationships between elements of the source information, comprising a plurality of activities comprising: obtaining configuration information from a computer based validated biopharmaceutical batch process control system; identifying patterns in the configuration information, inferring relationships between the patterns and corresponding domain concepts, and generating configuration information that encodes the domain concepts; based upon an automatically detected hierarchy among elements of the configuration information automatically obtaining a first transformed version of the configuration, said first transformed version of the configuration information including the generated configuration information that encodes the domain concepts; generating, via a first set of instructions encoded in DHTML, a graphical user interface based on an automatically detected hierarchy among element of the first transformed version of the configuration information; transforming the first transformed version of the configuration information using user input to obtain a second transformed version of the configuration information, the user input obtained via the graphical user interface the user input indicative that a second set of transformations will be applied to obtain the second transformed version of the configuration information; and expressing the first transformed version and the second transformed version in a destination biopharmaceutical batch process control system, the biopharmaceutical batch process control system configured by the second transformed version to control a biopharmaceutical batch process.

2. The computer-based translation method of claim 1, further comprising converting the information into a common format.

3. The computer-based translation method of claim 1, further comprising converting the information into a user-definable syntax.

4. The computer-based translation method of claim 1, further comprising converting the information into XML.

5. The computer-based translation method of claim 1, further comprising importing the first transformed version into the destination system, the first transformed version obtained from a Bailey INFI-90 configuration database.

6. The computer-based translation method of claim 1, further comprising importing the second transformed version into the destination system, the second transformed version comprising configuration elements associated with a WinCCoperator console.

7. The translation method of claim 1, further comprising parsing the information, the information obtained from an APACS control system configuration database.

8. The translation method of claim 1, further comprising expressing the information in an XML syntax.

9. The translation method of claim 1, further comprising applying XSLT transforms to the information.

10. The translation method of claim 1, further comprising applying XSLT transforms to the information and generating DHTML.

11. The translation method of claim 1, further comprising generating DHTML, encoding a plurality of options for used in translating of an element of the information.

12. The translation method of claim 1, further comprising generating a plurality of options adapted for used in translation of an element of the information.

13. The translation method of claim 1, further comprising interpreting a plurality of options adapted for use translation of an element of the information using DHTML instructions.

14. The translation method of claim 1, further comprising creating graphical user interface elements adapted to present a plurality of options for translating an element of the information.

15. The translation method of claim 1, further comprising presenting a plurality of options for use in translation of an element of the information.

16. The translation method of claim 1, further comprising presenting to each of a plurality of users, a plurality of options adapted for use in translation of an element of the information.

17. The translation method of claim 1, further comprising presenting to each of a plurality of users, a plurality of options adapted for use in translation of an element of the information, the plurality of options and the information element differing for each of the plurality of users.

18. The translation method of claim 1, further comprising presenting in the graphical user interface a plurality of options adapted for use in translating an element of the information.

19. The translation method of claim 1, further comprising receiving a user-selected option from a plurality of options for use in translating an element of the information.

20. The translation method of claim 1, further comprising receiving input relating to an element of the information from a user.

21. The translation method of claim 1, further comprising receiving input from each of a plurality of users regarding each user's preference adapted for use in translating an element of the information.

22. The translation method of claim 1, further comprising receiving input from each of a plurality of users regarding each user's preference adapted for use in translating an element of the information, a first user's preference overriding a second user's preference.

23. The translation method of claim 1, further comprising tracking received user input adapted for use in translating an element of the information.

24. The translation method of claim 1, further comprising providing an audit trail of the user input relating to a translation of an element of the information.

25. The translation method of claim 1, further comprising providing an audit trail of the user input.

26. The translation method of claim 1, further comprising repeating said applying activity.

27. The translation method of claim 1, further comprising repeating said transforming activity.

28. The translation method of claim 1, further comprising providing a view of the destination system, the destination system a PCS7 control system.

29. The translation method of claim 1, further comprising providing a plurality of differing views of the destination system, each of the plurality of differing views corresponding to a different use for the destination system.

30. The translation method of claim 1, further comprising presenting in the graphical user interface the information and the second transformed version.

31. The translation method of claim 1, further comprising presenting in the graphical user interface the information and the second transformed version, a change in the user input reflected in the second transformed version.

32. The computer-based translation method of claim 1, wherein the second transformed version is based on the first transformed version.

33. The computer-based translation method of claim 1, wherein the second transformed version is not based on the first transformed version.

34. The computer-based translation method of claim 1, wherein a pattern matching rule from the first plurality of pattern matching rules is based on a plurality of knowledge elements and at least one known relationship between the plurality of knowledge.

35. The translation method of claim 1, wherein XSLT is employed to translate the information.

36. The translation method of claim 1, wherein at least one of the first plurality of patterns is a set.

37. The translation method of claim 1, wherein at least one of the first plurality of patterns is a hierarchy.

38. The translation method of claim 1, wherein at least one of the first plurality of patterns is a naming convention.

39. The translation method of claim 1, wherein the user input is derived from input from a first user and input from a second user.

40. The translation method of claim 1, wherein the user input is derived from input from a first user and input from a second user, the first user occupying a different position in a value chain than the second user.

41. The translation method of claim 1, wherein the user input is derived from input from a first user and input from a second user, the first user occupying a different position in a business process than the second user.

42. The translation method of claim 1, wherein the user input is derived from input from a first user and input from a second user, at least a portion of the input from the second user altering at least a portion of the input from the first user.

43. The computer-based translation method of claim 1, further comprising:
  automatically detecting the hierarchy among elements of the configuration information based upon a naming convention that suggests a relationship between elements of the hierarchy, the second transformed version transformed from the first transformed version via:
    cascade rules that apply increasingly domain specific translation rules; and
    a contextual user interface in parallel with an incomplete translation, the contextual graphical user interface adapted to allow a customer to assist in the translation.

44. A machine readable medium comprising instructions for a computer based translation method that translate source information into target information using knowledge that arises from relationships between elements of the source information, the method comprising a plurality of activities comprising: obtaining configuration information from a computer based validated biopharmaceutical batch process system; identifying patterns in the configuration information, inferring relationships between the patterns and corresponding domain concepts, and generating configuration information that encodes the domain concepts; based upon an automatically detected hierarchy among elements of the configuration information automatically obtaining a first transformed version of the configuration, said first transformed version of the configuration information including the generated configuration information that encodes the domain concepts; generating, via a first set of instructions encoded in DHTML, a graphical user interface based on an automatically detected hierarchy among elements of the first transformed version of the configuration information; transforming the first transformed version of the configuration information using user input to obtain a second transformed version of the information, the user input obtained via the graphical user interface the user input indicative that a second set of transformations will be applied to obtain the second transformed version of the configuration information; and expressing the first transformed version and the second transformed version in a destination biopharmaceutical process control system, the biopharmaceutical process control system configure by the second transform version to control a biopharmaceutical process.

45. A computer based system adapted to translate source information into target information using knowledge that arises from relationships between elements of the source information, the system comprising: means for obtaining configuration information from a computer based validated biopharmaceutical batch process control system; means for identifying patterns in the configuration information inferring relationships between the patterns and corresponding domain concepts, and generating configuration information that encodes the domain concepts; means for automatically obtaining based upon an automatically detected hierarchy among elements of the configuration information a first transformed version of the configuration information, said first transformed version of the configuration information including the generated configuration information that encodes the domain concepts; means for generating, via a first set of instructions encoded in DHTML, a graphical user interface based on an automatically detected hierarchy among elements of the first transformed version of the configuration information; and means for transforming the first transformed version of the configuration information using user input to obtain a second transformed version of the configuration information, the user input obtained via the graphical user interface the user input indicative that a second set of transformations will be applied to obtain the second transformed version of the configuration information; and means for expressing the first transformed version and the second transformed version in a process control destination system, the process control destination system configured by the second transform version to control an process.

* * * * *

UNITED STATES PATENT AND TRADEMARK OFFICE
CERTIFICATE OF CORRECTION

| | | |
|---|---|---|
| PATENT NO. | : 7,603,332 B2 | Page 1 of 1 |
| APPLICATION NO. | : 10/626443 | |
| DATED | : October 13, 2009 | |
| INVENTOR(S) | : Michael Hogan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1250 days.

Signed and Sealed this

Fifth Day of October, 2010

David J. Kappos
*Director of the United States Patent and Trademark Office*